US008887120B1

(12) United States Patent
Verma et al.

(10) Patent No.: US 8,887,120 B1
(45) Date of Patent: Nov. 11, 2014

(54) TIMING PATH SLACK MONITORING SYSTEM

(71) Applicants: Chetan Verma, Noida (IN); Amit Kumar Dey, Noida (IN); Amit Roy, Noida (IN); Vijay Tayal, Noida (IN)

(72) Inventors: Chetan Verma, Noida (IN); Amit Kumar Dey, Noida (IN); Amit Roy, Noida (IN); Vijay Tayal, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 14/141,473

(22) Filed: Dec. 27, 2013

(51) Int. Cl.
| | |
|---|---|
| *G06F 17/50* | (2006.01) |
| *G06F 19/00* | (2011.01) |
| *G01R 13/00* | (2006.01) |
| *G01R 29/00* | (2006.01) |
| *G01R 23/00* | (2006.01) |
| *H01L 25/00* | (2006.01) |
| *H03K 19/00* | (2006.01) |

(52) U.S. Cl.
CPC ............ *G06F 17/5031* (2013.01); *G01R 13/00* (2013.01); *H03K 19/00* (2013.01); *G06F 19/00* (2013.01); *G01R 29/00* (2013.01); *G01R 23/00* (2013.01); *H01L 25/00* (2013.01)
USPC ............. 716/136; 716/113; 716/134; 703/16; 703/19; 702/70; 702/72; 702/78; 702/106; 702/125; 326/29; 326/31; 326/93; 326/101

(58) Field of Classification Search
CPC ... G06F 17/5031; G06F 17/5081; G06F 7/38; G06F 19/00; H03K 19/00; H01L 25/00; G01R 13/00; G01R 29/00; G01R 23/00
USPC ......... 716/136, 113, 134; 703/16, 19; 702/70, 702/72, 78, 79, 106, 125; 326/29, 31, 93, 326/101
See application file for complete search history.

(56) References Cited

U.S. PATENT DOCUMENTS

| | | | | |
|---|---|---|---|---|
| 4,379,265 | A | * | 4/1983 | Catiller .......................... 327/261 |
| 4,390,903 | A | * | 6/1983 | Pomeroy ....................... 358/480 |
| 4,890,248 | A | * | 12/1989 | Reinhardt ..................... 702/191 |

(Continued)

FOREIGN PATENT DOCUMENTS

SU          1660153 A   *  6/1991   ............. H03K 5/156

OTHER PUBLICATIONS

Timo Rahkonen and Juha Kostamovaara, "Pulse Width Measurement Using an Integrated Pulse Shrinking Delay Line", IEEE International Symposium on Circuits and Systems, May 1-3, 1990.

(Continued)

*Primary Examiner* — Phallaka Kik
(74) *Attorney, Agent, or Firm* — Charles Bergere (57) ABSTRACT

An on-chip timing slack monitor that measures timing slack at the end of a critical path includes a master-slave flip-flop having a tap on the Q output of the master and a logic module coupled to the flip-flop for producing a pulse whose width is a function of the slack. A pulse width shrinking delay line removes glitches on the flip-flop output and, in combination with a digital integrator and counter, also performs a time to digital conversion operation for determining a value for timing path slack. The determined value is used by a decision module for yield analysis. The monitor can discriminate a glitch from a slack pulse at the flip-flop output for any width of glitch up to one-half of a clock cycle.

17 Claims, 4 Drawing Sheets

(56) References Cited

U.S. PATENT DOCUMENTS

| | | | | |
|---|---|---|---|---|
| 5,382,899 | A | * | 1/1995 | Funatsu et al. ............ 324/207.18 |
| 5,619,157 | A | * | 4/1997 | Kumata et al. ................. 327/203 |
| 6,069,511 | A | * | 5/2000 | Mohan .......................... 327/171 |
| 6,473,316 | B2 | * | 10/2002 | Fujiyama et al. ................ 363/17 |
| 6,532,574 | B1 | * | 3/2003 | Durham et al. ................. 327/292 |
| 6,548,996 | B2 | * | 4/2003 | Yi ................................. 323/349 |
| 7,131,092 | B2 | * | 10/2006 | Ham ............................. 716/113 |
| 8,154,335 | B2 | | 4/2012 | Chawla et al. |
| 8,181,147 | B2 | | 5/2012 | Tang et al. |
| 8,228,106 | B2 | | 7/2012 | Baumann et al. |
| RE43,775 | E | * | 10/2012 | Kwak et al. .................... 327/161 |
| 2005/0127947 | A1 | * | 6/2005 | Arnold et al. .................... 326/93 |
| 2006/0103458 | A1 | * | 5/2006 | Hansen et al. ................... 330/10 |
| 2006/0200716 | A1 | * | 9/2006 | Carpenter et al. ............. 714/724 |
| 2009/0039867 | A1 | * | 2/2009 | Saint-Laurent et al. ....... 324/102 |
| 2011/0133771 | A1 | * | 6/2011 | Anderson ........................ 326/30 |
| 2012/0032703 | A1 | * | 2/2012 | Crespo et al. .................... 326/93 |
| 2012/0086470 | A1 | * | 4/2012 | Diffenderfer .................... 326/30 |
| 2012/0206889 | A1 | * | 8/2012 | Norman ......................... 361/761 |
| 2012/0326701 | A1 | | 12/2012 | Chen et al. |
| 2014/0075403 | A1 | * | 3/2014 | Palmer et al. .................. 716/113 |

OTHER PUBLICATIONS

Shuo Wang, Mohammad Tehranipoor and Leroy Winemberg, "In Field Aging Measurement and Calibration for Power Performance Optimization", Design Automation Conference (DAC), 2011.

Alan Drake, et. al., "A Distributed Critical-Path Timing Monitor for a 65nm High-Performance Microprocessor", ISSCC 2007/ Session 22/ Digital Circuit Innovations/ 22.1, IEEE International Solid-State Circuits Conference, 2007, pp. 398-399.

Xiaoxiao Wang, Mohammad Tehranipoor, Seiji George, Dat Tran and Leroy Winemberg, "Design and Analysis of a Delay Sensor Applicable to Process/Environmental Variations and Aging Measurements", IEEE Transations on Very large Scale Integration (VLSI) Systems, vol. 20, No. 8, Aug. 2012, pp. 1405-1418.

Liangzhen Lai, Vikas Chandra, Robery Aitken and Puneet Gupta, "Slack Probe: A Low Overhead In Situ On-line Timing Slack Monitor Methodology", EDAA 2013.

Joshua M. Levine, Edward Stott, George A. Constantinides and Peter Y.K. Cheung, "Online Management of Timing in Circuits: for Health Monitoring and Digital Voltage & Frequency Scaling", Field-Programmable Custom Computing Machines (FCCM), 2012 IEEE 20th Annual International Symposium, IEEE, 2012.

* cited by examiner

TIMING PATH SLACK MONITORING SYSTEM

BACKGROUND OF THE INVENTION

The present invention relates generally to integrated circuits and, more particularly, to a timing path slack monitoring system for an integrated circuit.

Research into VLSI (very large scale integration) degradation mechanisms suggests that timing performance deterioration could be a major concern in future process technologies. Therefore, a good deal of attention has to be paid to timing margins. A number of techniques have been proposed for detecting timing faults, errors induced by paths failing to meet timing requirements, in circuits while they are operating on line. There are also various classes of known monitors that are targeted at measuring circuit path delay. Canary or replica circuits are stand-alone circuits intended to mimic the timing behavior of the original circuits. The delay of the real circuit can be estimated through measuring delay of the replicas. Replica monitors are usually non-intrusive, but may fail to capture the variations that are local to real circuits such as random manufacturing variations and circuit aging. A measurement of timing slack at the end of critical paths however can capture the variations that are local to real circuits. Reductions in the amount of slack indicate that the circuit is degrading or aging and changes due to temperature, voltage and other fluctuations can be tracked, making timing slack a good measure of health. Since critical paths typically end at registers, some special flip-flops can be used as slack monitors.

"In-field aging measurement and calibration for power-performance optimization" by Wang et. al., DAC 2011, Jun. 5-10, 2011 describes an on-chip aging sensor that includes a master-slave flip-flop having a tap on the Q output of the master. A timing margin T (or slack) is assumed where T is defined as the difference between the time of arrival of a transition at the master and an input clock's rising edge. A pulse width W at the output of a series of logic gates coupled to the master and slave outputs bears a relation to T. A delay line, ring oscillator and counter are employed to measure W and thereby determine a value for T. A reduction in the measured value of T over time can signify aging of the integrated circuit whose paths are being monitored. One drawback of this circuit is that it can only discriminate against glitches on the input to the master, which are wider than a certain minimum duration. Accordingly, it would be advantageous to have a timing slack monitor circuit that also can discriminate from glitches on its output.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention. In the drawings, like numerals are used to indicate like elements throughout. Furthermore, terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a timing path slack monitoring system including a flip-flop for capturing transitions of a signal transmitted along a signal line of an integrated circuit. A logic module is coupled to the flip-flop and receives an output of the flip-flop and generates an output signal that includes a first pulse whose width is a function of timing path slack associated with the signal line. A pulse width shrinking circuit is connected to the logic module and receives the output signal from the logic module and generates in response, a series of pulses of decreasing width, where a time taken for the series of pulses to die away is a function of the width of the first pulse. An integrator is connected to an output of the pulse shrinking circuit for integrating the series of pulses to generate a second pulse having a duration that is a function of a dying time of the first pulse. A timer is connected to an output of the integrator and measures the duration of the second pulse.

In another embodiment, the present invention provides a method for monitoring timing path slack, including: capturing a transition of a signal transmitted along a signal line of an integrated circuit in a flip-flop, generating a first pulse in response to the transition, where the width of the first pulse is a function of timing path slack associated with the signal line, receiving in a pulse width shrinking circuit the first pulse and producing in response, a series of pulses of decreasing width, where a time taken for the series of pulses to die away is a function of the width of the first pulse, integrating the series of pulses to produce a second pulse whose duration is a function of a dying time of the first pulse, and measuring a duration of the second pulse.

Figure 1:
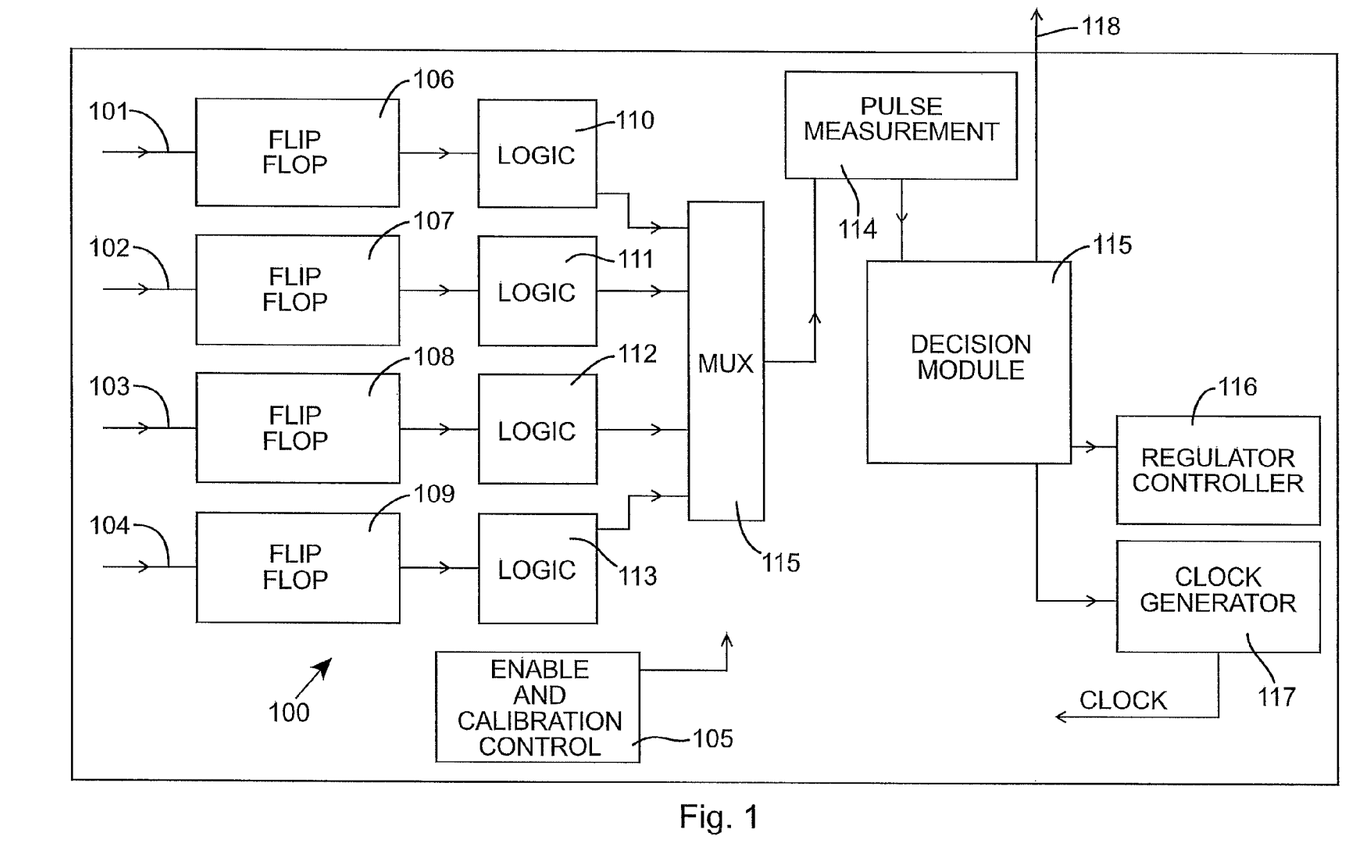
FIG. 1 is a schematic block diagram of a timing path slack monitoring system implemented within an integrated circuit, in accordance with an embodiment of the present invention.

Referring now to FIG. 1, integrated circuit 100 having a timing path slack monitoring system for monitoring path delays of one or more signal lines of the integrated circuit is shown. In this example, four signal lines 101, 102, 103, 104 are shown, although more or fewer lines may be monitored. The integrated circuit 100 may be, for example, a microprocessor, microcontroller, digital signal processor, system on a chip (SOC) or indeed, any integrated circuit. The integrated circuit 100 may comprise a processor core, memories and communications interfaces. However, such elements are omitted from FIG. 1 for the sake of clarity and are not essential for the understanding of the invention.

In one example, the signal lines 101-104 may be critical paths of the integrated circuit 100 or may be paths that are sensitive to aging. Periodic measurements, initiated by an enable and calibration control module 105 may be made in order to determine a timing path slack (also referred to herein as "slack") associated with each of four flip-flops 106-109 located on each of the signal lines 101-104. An actual timing path slack is equivalent to a path delay and may be converted to a digital value. In one example, the flip-flops 106-109 may be timing-critical flip-flops. The outputs of each of the flip-flops 106-109 are connected to associated logic modules 110-113 so that each flip-flop may be monitored for available slack by a pulse measurement circuit 114. In the example of FIG. 1, one pulse measuring circuit 114 is shared by the four flip-flops 106-109 and their associated logic blocks 110-113 by virtue of a 4:1 multiplexer 115. A transition on a flip-flop's input may be detected and then converted to a pulse in an associated logic block, and the width of the pulse is measured by the pulse measuring circuit 114. The pulse width is used to provide a measure of the timing path slack. Any glitches appearing at the flip-flops' inputs is handled by the pulse measurement circuit 114 in a manner (to be described below) such that they do not affect the slack measurement result. The results of the pulse measurement circuit 114 are received by a decision module 115.

Timing path slack information may be determined for several paths. In general, timing path slack varies for different transition types (logic "0" to logic "1", logic "1" to logic "0"), off-path inputs and voltage drops so in one embodiment, the decision module 115 records a minimum slack observed from multiple transitions on each path because only the minimum slack is critical to reliability of the integrated circuit 100.

The decision module 115 compares the measured slack for each flip-flop 106-109 with a predetermined value (a minimum value, for example) and/or to track changes in slack over time. In one embodiment, the decision module 115 generates control signals that are applied to a regulator controller 116 and a clock generator 117 for enabling voltage/frequency scaling for the integrated circuit 100. The regulator controller 116 controls an operating voltage Vdd of the integrated circuit 100 and the clock generator 117 regulates the frequency of a clock signal of the integrated circuit 100 that is input to the flip-flops 106-109, logic modules 110-113 and pulse measurement circuit 114. For example, if the measured slack associated with one or more of the flip-flops 106-109 is found by the decision module 115 to be less than a predetermined minimum value, then the decision module 115 causes the regulator controller 116 to adjust Vdd in order to improve performance, as a reduced slack margin may indicate degradation through aging. Depending on the decision module's output, the regulator controller 116 scales Vdd up or down accordingly. Similarly, the decision module 115 instructs the clock generator 117 to scale the clock frequency up or down depending on the results received from the pulse measurement circuit 114, such as by controlling a phase locked loop in the clock generator 117, for example.

The decision module 115 may also provide an output on line 118 for application to systems external to the integrated circuit 100. The output on line 118 may be used by a yield analysis system (not shown) for example. A timing-driven yield analysis may be performed in accordance with known methods based on a minimum measured slack value associated with any one of the signal lines 101-104.

It will be appreciated that the embodiment of FIG. 1 provides an on-chip slack monitoring system that is able to monitor timing delays of actual signal paths (rather than the replicated paths of some known systems). The system also may be used to monitor slack while the integrated circuit 100 is in a functional mode; that is to say that the integrated circuit does not have to be put into a specific test mode in order to carry out slack monitoring.

Measurements of slack values taken at periodic intervals may be compared for providing early signs of aging of the integrated circuit 100. Advantageously, the embodiment of FIG. 1 may enable users of the integrated circuit 100 to monitor the health of the integrated circuit 100 in the field and may also obviate the need for any built-in self-test circuitry.

Figure 2:
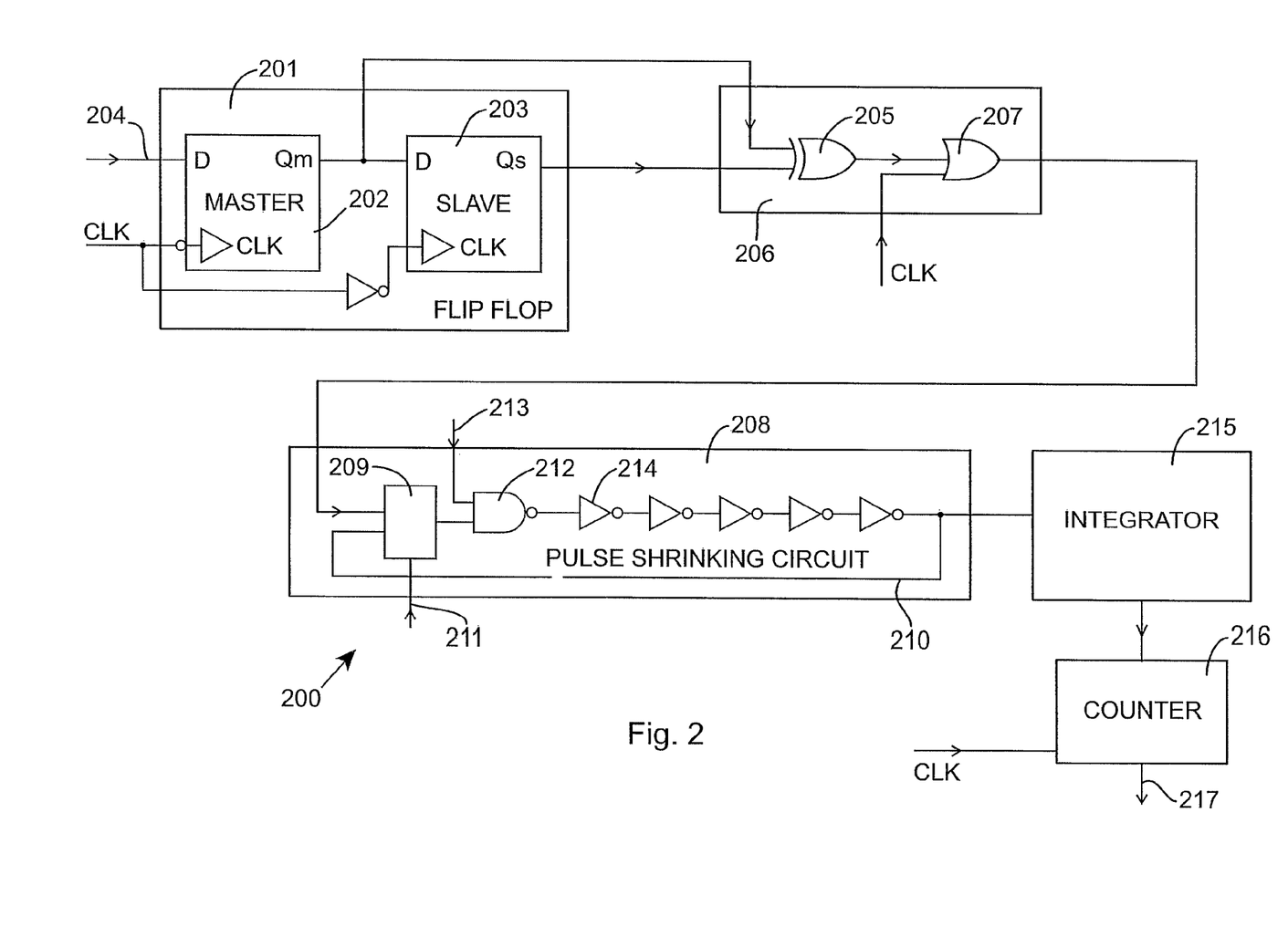
FIG. 2 is a simplified schematic block diagram of some of the circuits of the timing path slack monitoring system of FIG. 1.

Referring now to FIG. 2, a simplified schematic block diagram of a timing path slack monitoring system 200 is shown. A flip-flop 201, which may be considered to be equivalent to (any) one of the flip-flops 101-104 mentioned above with reference to FIG. 1, comprises a master-slave flip-flop represented in FIG. 2 by a master block 202 and a slave block 203. The master block 202 receives signal input transitions at its "D" input on an input signal line 204. The input signal line 204 may be equivalent to (any) one of the signal lines 101-104 mentioned above with reference to FIG. 1. The master block 202 also is provided with a clock signal, CLK, at its clock input. The slave block 203 receives at its "D" input, an output of the master block 202, Qm, and receives an inverted version of the clock signal at its clock input. The clock signal may be provided by a clock generator (not shown).

An output of the master block 202 may be tapped so that the Q output "Qm" of the master block 202 along with the Q output "Qs" of the slave block 203 are output to a logic module 206. The logic module 206 has an exclusive OR gate 205 that receives at its inputs the Qm and Qs outputs of the flip-flop 201. The logic module 206 also includes an OR gate 207 that receives at its inputs the output of the XOR gate 205 and the clock signal CLK. The logic module 205 may be considered to be equivalent to (any) one of the logic modules 110-113 of FIG. 1.

An output of the logic module 206, which comprises the output of the OR gate 207, is input to a pulse shrinking circuit 208. The pulse shrinking circuit 208 has a control input gate 209 that receives the output of the logic module 206, a feedback signal on line 210 and a strobe signal on line 211. The strobe signal may be provided by control circuitry (not shown) which, in one example, may be equivalent to the enable and calibration control module 105 mentioned above with reference to FIG. 1. An output of the control input gate 209 is provided to a first input of a NAND gate 212. A second input of the NAND gate 212 on line 213 may comprise an enable/disable signal that may be provided by control circuitry (not shown) which, in one example, may be equivalent to the enable and calibration control module 105 mentioned above with reference to FIG. 1. An output of the NAND gate 212 is connected to a first inverter 214, whose output, in turn, is connected to a further inverter and so on whereby the pulse shrinking circuit comprises an inverter chain. Five inverters are shown in the example of FIG. 2 but more or less may be provided. The total number of inverters including the NAND gate preferably is an even number. An output of the final inverter in the chain comprises the feedback signal on line 210, which is fed to the control input gate 209. In one example, the control input gate 209 comprises a 2:1 multiplexer whose select input receives the strobe signal.

An output of the pulse shrinking circuit 208 is connected to an input of an integrator 215, and an output of the integrator 215 is connected to the input of a timer module or a counter 216. The counter 216 also receives the clock signal. An output of the counter on line 217 comprises a value indicative of slack within the flip-flop 201 (and therefore of a path delay on the input signal line 204).

The pulse shrinking circuit 208, integrator 215 and counter 216 may be considered to be equivalent to the pulse measurement circuit 114 of FIG. 1 and the outputs of the counter 216 on line 217 may be used by a decision module, which may comprise, for example, the decision module 115 mentioned above with reference to FIG. 1.

Figure 3:
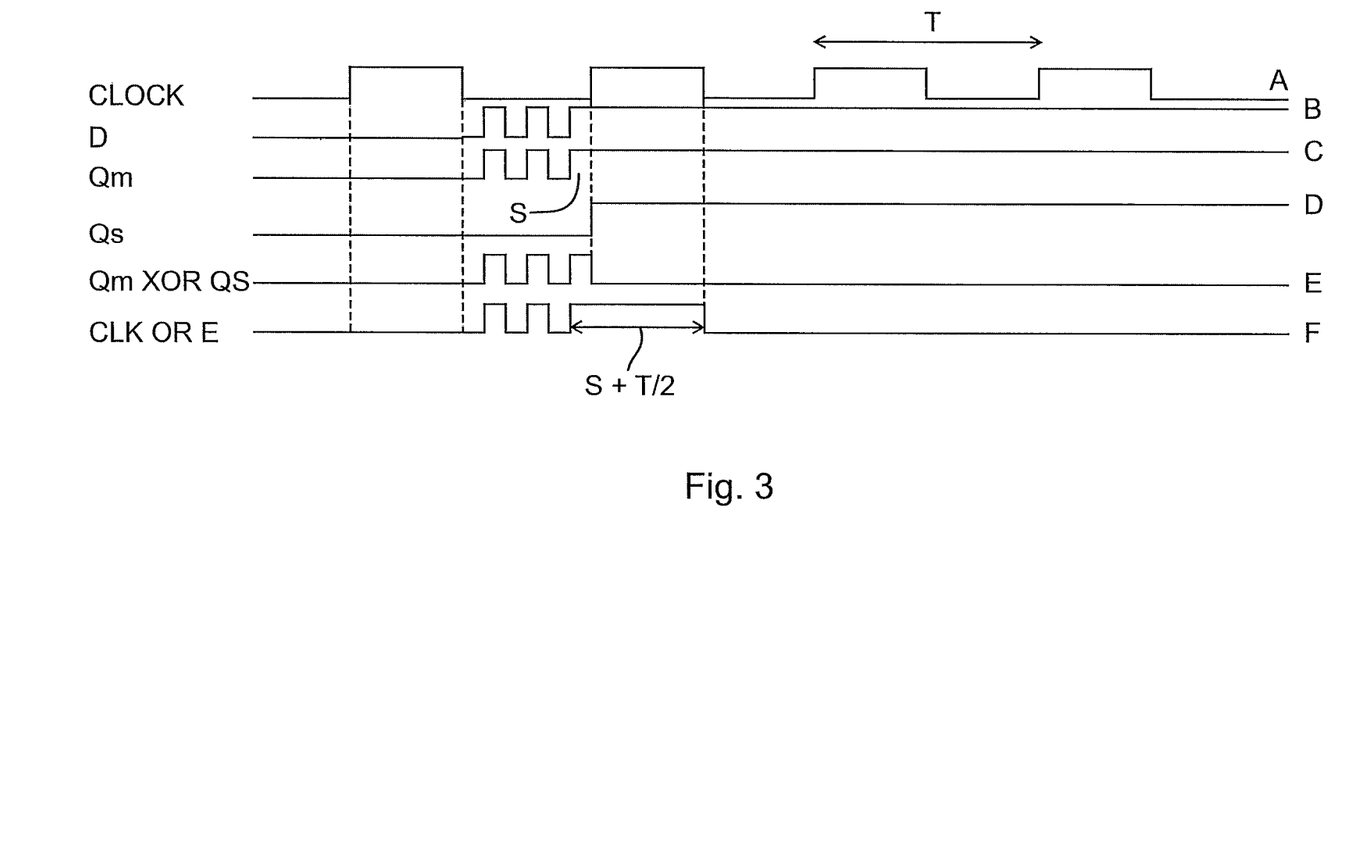
FIG. 3 is a timing diagram representing signals present within the timing path slack monitoring system of FIG. 2.

FIG. 3 is a timing diagram showing the various input and output signals of the flip-flop 201 and the logic module 206 in one exemplary method of operation of the system 200 of FIG. 2. With reference to the timing diagram of FIG. 3, a first trace "A" represents the clock signal, of period T, which is fed to the master block 202 of the flip-flop 201. An inverted version of the clock signal is received by the slave block 203. A second trace labeled B shows an example of a data signal received at the "D" input of the master block 202 of the flip-flop 201. The data is shown to be "glitchy" data in that two glitches precede a data transition from a logical "0" to a logical "1". The glitches and data transition occur, in this example, while the clock is low and while the clock input to the master block 202 is low, any signal appearing at the master's "D" input is transferred to the output of the master, Qm. Trace C shows the output Qm of the master block 202. Note that when the clock is high, glitches are blocked by the master block 202. A slack "S" is defined as the time difference between the transition arrival time at the master's "D" input and the clock's rising edge. Trace D shows the output Qs of the slave block 203. The output Qs follows its input (i.e., Qm) on each positive-going edge of the clock signal. The slave block 203 passes data only when the clock is high. Trace E represents the output of the XOR gate 205 whose inputs are traces C and D. Thus, the XOR gate 205 captures the glitches and also captures a "slack" pulse whose width equals the slack "S." Note that the slack and glitch width may be of a comparable size but it is reasonable to assume that a glitch will never be more than half a clock cycle (T/2).

In order to discriminate between a glitch and a slack pulse, one-half of a clock cycle is (selectively) added to the slack pulse but not to a glitch. This may be achieved by the OR gate 207 whose inputs are the output of the XOR gate 205 (see trace E) and the clock signal (trace A). The output of the OR gate 207 is represented by trace F. The glitches appear at the OR gate's output unchanged but the slack pulse is now extended by half a clock cycle to (S+T/2). Note also that the logic module 206 enables a slack pulse to be captured whether the input "D" is transitioning from a logic "0" to a logic "1 (as in the example of FIG. 3) or from a logic "1 to a logic "0." The extended slack pulse is a function of the timing margin (or delay of a signal path).

Referring again to FIG. 2, the output of the logic module 206, which may comprise one or more glitches and an extended slack pulse, is fed to the pulse shrinking circuit 208. During a calibration or slack monitoring procedure, the pulse shrinking circuit 208 is enabled by an appropriate signal applied on line 213 to the NAND gate 212, which serves as a first inverter of the inverter chain that acts as a delay line. Pulse shrinking delay lines are known and typically comprise a chain of inverters (or logic gates). A skewed delay line may be constructed such that there are different propagation delays for rising and falling edges of a pulse. For example, as a pulse is fed into the skewed delay line, its leading (rising) edge will start to propagate at a particular rate per element. If the trailing (falling) edge of the pulse is subjected to less delay per element then it starts to chase the leading edge until it reaches a certain point in the delay line whereupon the pulse vanishes. Such a pulse shrinking delay line may be constructed by ensuring that the NMOS and PMOS transistors used to form the inverters of the delay line have particular properties. The inverter chain comprising the pulse shrinking circuit 208 of FIG. 2 may be configured as a delay line such that, the NMOS transistors are chosen to be fast and the PMOS transistors are chosen to be slow so that the pulses passing through the inverters shrink each time. In one example, the delay line is long enough to contain the input pulses, that is, that its delay is just greater than one clock period thereby ensuring that the whole input pulse (glitches plus slack half a clock period) are contained inside the delay line. Thus, the pulse shrinking circuit 208 exploits the property of pulse shrinking (i.e., skew between NMOS and PMOS) by configuring the inverter chain in order to ensure that pulses shrink after every iteration. This ensures that any glitch present always dies away before the (extended) slack pulse dies. In this way, any glitch (or glitches) present in the input to the pulse shrinking circuit 208 are removed. In the pulse shrinking circuit 208, the inverters form a feedback loop so that the extended slack pulse performs several iterations through the inverter chain with the width of the extended slack pulse becoming smaller after every iteration. After a certain number of iterations, the extended slack pulse eventually dies away. A decay time (i.e., the time it takes for the extended slack pulse to die away completely after being launched at the input of the pulse shrinking circuit 207) is proportional to its original width. Thus a measure of the decay time is used as a slack pulse width measurement. It will be noted that even if a glitch does not die away in the first iteration, (i.e., before reaching the end of the delay line), the glitch will shrink in the next iteration. It may take several iterations for glitches to die, which will be the case if glitch width is large enough to pass the first iteration. However, a glitch will always die before the extended slack pulse dies. That is, the number of iterations taken by the glitch to die is always less than the number of iterations taken by the (extended) slack pulse to die. This ensures that a decay time is always proportional to slack width regardless of the glitches.

In one example, while the enable/disable signal on line 213 is set to enable and the strobe signal on line 211 is set to a logical "1" for the duration of one clock cycle (e.g., from one falling edge to the next) the control input gate 209 allows the output of the logic module 206 (which may comprise one or more glitches and an extended slack pulse, (trace F of FIG. 3) to be applied to the inverter chain (comprising the NAND gate 212 and the five subsequent inverters). At the end of the clock cycle, the strobe signal goes low, whereupon the control input gate 209 puts the pulse shrinking circuit 207 into a feedback mode by connecting the output of the final inverter in the inverter chain to the NAND gate 212. Now, the output of the inverter chain is connected to its input. As mentioned above, the glitch will always die before the (extended) slack pulse does. This ensures that the decay time is always proportional to the slack width irrespective of the glitches. Hence, the output of the pulse shrinking circuit 208, which is connected to the integrator 215, is a series of pulses of ever diminishing width. The time it takes for the series of output pulses to die away completely is a function of the width of the extended slack pulse. Thus by virtue of the logic module 206 and pulse shrinking circuit 208, a glitch can be discriminated from a slack pulse for any width of glitch up to half a clock cycle.

The integrator 215 integrates all of the pulses appearing at the output of the pulse shrinking circuit 208. An output of the integrator 215 is then a single positive-going pulse having a width that is a function of the decay time of the extended slack pulse and therefore a function of its width. In one embodiment, the integrator 215 comprises a low pass filter. In another embodiment, the integrator 215 comprises a digital integrator, and in one example, the digital integrator comprises another skewed inverter chain where the PMOS transistors are fast and the NMOS transistors are slow. This arrangement extends any positive-going pulse that passes through the digital integrator.

The output of the integrator 215 is applied to an input of the counter 216. The counter 216 may comprise a conventional arrangement for determining the duration of the pulse appearing on the output of the integrator 215. In one example, the counter 216 receives a clock input and is enabled by the rising edge of the pulse from the integrator 215 and disabled by the falling edge of the pulse from the integrator 215. In this way, the counter 216 records a number of clock periods that elapse between the rising and falling edges of the pulse appearing at the output of the integrator 215. As half a clock cycle was previously added to the slack pulse (in the logic module 206) this may be removed from the recorded number of clock periods either in the counter or by a separate logic module (not shown). The resulting corrected number of clock periods is a measure of the slack "S." Knowing the clock frequency and the characteristics of the pulse shrinking circuit, an actual value for the slack "s" may be calculated. The counter 216 is arranged to calculate this value or alternatively, it may be calculated by a decision module such as the decision module 115 of FIG. 1. The output of the counter 216 on line 217 may be used by a decision module and/or by a yield analysis process.

Figure 4:
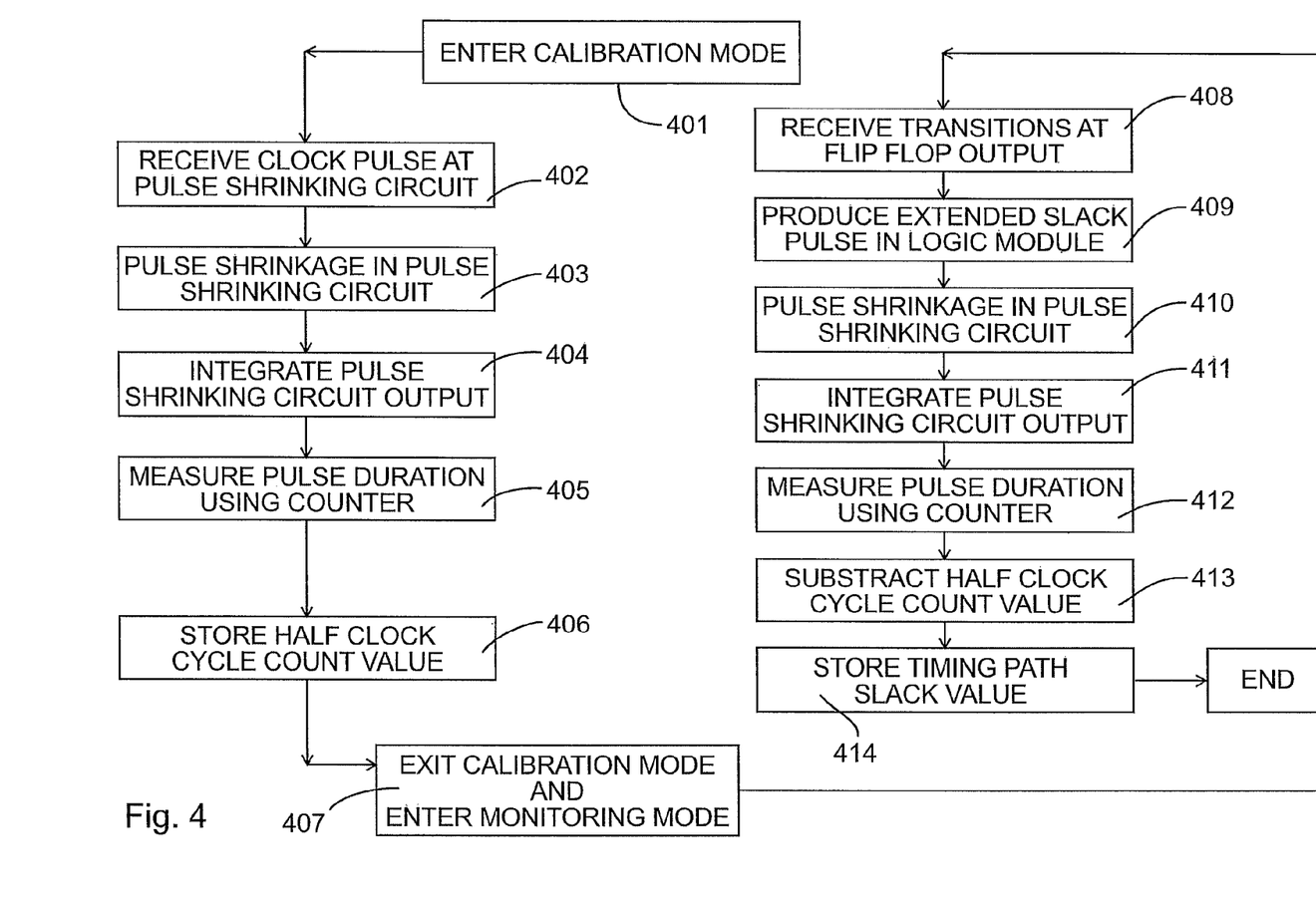
FIG. 4 is a simplified flow chart of a method of monitoring timing path slack in an integrated circuit.

A method 400 for monitoring a timing path slack will now be described with reference to the simplified flowchart of FIG. 4 and also to FIGS. 1 and 2. At 401, the slack monitoring system 200 enters a calibration mode. A calibration serves to characterize the pulse measurement circuit 114 and as half a clock cycle may be added to the slack pulse during a slack pulse measurement phase, the calibration procedure may enable measurement and storage of a count corresponding thereto. At 402, in the calibration mode, a clock pulse, lasting for one clock cycle and commencing with a falling edge and ending with the next falling edge (for example), is received by the pulse shrinking circuit 208. At 403, this clock pulse then passes through several iterations of the inverter chain of the pulse shrinking circuit 208 whose output, comprising a series of shrinking pulses is integrated by the integrator 215 at 404. The output of the integrator, comprising a single pulse having a rising edge and falling edge is used to start and stop a counter 216 which in turn, at 405, measures the pulse duration. At 406 the half clock cycle count value measured by the counter is stored.

At 407, the calibration mode is exited and a slack monitoring mode is entered. In the monitoring mode, at 408, the master-slave flip-flop 201 receives a transition on its input line. The transition is captured and the flip-flop outputs are provided to the logic module 206 where at 409, an extended slack pulse whose width is a function of a timing path slack is generated. The generated pulse comprises a timing path slack extended by half a clock cycle of the clock signal applied to the master-slave flip-flop. At 410, the extended slack pulse passes through several iterations of the inverter chain of the pulse shrinking circuit 208 whose output, comprising a series of shrinking pulses is integrated by the integrator 215 at 411. The output of the integrator then comprises a single pulse whose duration is a function of the dying time of the extended slack pulse. Its rising edge and falling edge are used to start and stop a counter 216 which in turn, at 412, measures the pulse duration. At 413, a half cycle count value is subtracted from the counter output value to produce a corrected value, which is a function of the width of the slack pulse. The half cycle count value is that which has been determined by the calibration process and stored at 406. Thus, by measuring the duration of the output pulse from the integrator 215 and by knowing the properties of the pulse shrinking circuit, a value for the timing path slack may be obtained. At 414 the timing path slack value may be stored. Depending upon the value of the timing path slack, adjustments may be made to clock frequency and/or voltage supply, which may be applied to an integrated circuit incorporating the timing path slack monitoring system 200.

The pulse shrinking circuit and integrator of FIG. 2 may find application in the processing of high frequency signals where sampling rates may be limited. One or more pulse shrinking circuit and integrator combinations may be employed to effectively convert high frequency signals into low frequency signals for further processing by systems that are limited to handling low frequency signals. For example, a high frequency multiplexer may be operably coupled to several pulse shrinking circuit/integrator combinations. The high frequency multiplexer may be arranged to divide an incoming high frequency signal into several parts and schedule each part of the signal to a particular pulse shrinking circuit/integrator combination. Each pulse shrinking circuit/integrator combination may then be arranged to extend an incoming pulse width, thereby converting the high frequency signal to a low frequency signal. Advantageously, this arrangement may remove any glitches that may be present in the incoming high frequency signal. In an alternative arrangement, which may be usefully employed in cases where no glitches are expected to be present, the pulse shrinking circuit may be dispensed with and one or more integrators comprising a skewed inverter chain may be employed for extending pulse widths and thereby performing the high to low frequency conversion. This arrangement may be used as an alternative to the known method of clock domain crossing where data from a high frequency central processing unit is passed to a low frequency peripheral using a FIFO (First in first out shift register).

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the modules shown in FIG. 1 or FIG. 2 may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bond wires between the pins and the dies.

Also for example, the examples, or portions thereof, may implemented as soft or code representations of physical circuitry or of logical representations convertible into physical circuitry, such as in a hardware description language of any appropriate type.

The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A timing path slack monitoring system, comprising:
   a flip-flop for capturing transitions of a signal transmitted along a signal line of an integrated circuit, the flip-flop having at least one output;
   a logic module coupled to the flip-flop for receiving the at least one output and to generate an output signal that includes a first pulse having a width that is a function of a timing path slack associated with the signal line;
   a pulse width shrinking circuit having an input coupled to the logic module for receiving the output signal and generating in response, a series of pulses of decreasing width, wherein a time taken for the series of pulses to die away is a function of the width of the first pulse;
   an integrator coupled to an output of the pulse shrinking circuit for integrating the series of pulses to produce a second pulse at an output of the integrator, wherein a duration of the second pulse is a function of a dying time of the first pulse; and
   a timer having coupled to the output of the integrator for receiving the second pulse and for measuring the duration of the second pulse.

2. The system of claim 1, wherein the flip-flop comprises a master-slave flip-flop having a clock input that receives a clock signal, a master output and a slave output.

3. The system of claim 2, wherein the logic module comprises an exclusive OR gate and an OR gate, and wherein a first input of the exclusive OR gate is coupled to the slave output and a second input of the exclusive OR gate is coupled to the master output, and wherein a first input of the OR gate is coupled to an output of the exclusive OR gate and a second input of the OR gate receives the clock signal.

4. The system of claim 1, wherein the pulse width shrinking circuit comprises a delay line and a feedback circuit, wherein the delay line comprises a skewed inverter chain having an even number of inverter stages.

5. The system of claim 1, wherein the integrator comprises a low pass filter.

6. The system of claim 1, wherein the integrator comprises a digital integrator.

7. The system of claim 6, wherein the digital integrator comprises a skewed inverter chain.

8. The system of claim 1, wherein the timer comprises a counter that counts a number of clock periods that elapse between a rising edge of the second pulse and a falling edge of the second pulse.

9. The system of claim 1, wherein the timer subtracts a value equaling one-half of a clock period from a measured value of the duration of the second pulse.

10. The system of claim 1, further comprising a decision module that receives an output of the timer, compares the timer output with one or more predetermined parameters, and depending upon the comparison, generates one or more adjustment signals for regulating at least one of a voltage supply and a clock frequency supplied to the integrated circuit.

11. An integrated circuit including at least one timing path slack monitoring system, wherein the slack monitoring system comprises:

a flip-flop for capturing transitions of a signal transmitted along a signal line of the integrated circuit, wherein the flip-flop has at least one output;

a logic module coupled to the flip-flop for receiving the at least one output and generating an output signal that includes a first pulse whose width is a function of a timing path slack associated with the signal line;

a pulse width shrinking circuit having an input coupled to the logic module for receiving the output signal from the logic module and generating in response, a series of pulses of decreasing width, wherein a time taken for the series of pulses to die away is a function of the width of the first pulse;

an integrator coupled to an output of the pulse shrinking circuit for integrating the series of pulses to produce a second pulse at an output of the integrator, wherein a duration of the second pulse is a function of the dying time of the first pulse; and a timer having an input coupled to the output of the integrator for measuring the duration of the second pulse.

12. The integrated circuit of claim 11, further comprising a decision module coupled to the timer for receiving an output of the timer, comparing the timer output with one or more predetermined parameters, and depending upon the comparison, generating one or more adjustment signals for regulating at least one of a voltage supply and a clock frequency supplied to the integrated circuit.

13. The integrated circuit of claim 12, wherein the timer comprises a counter that counts a number of clock periods that elapse between a rising edge and a falling edge of the second pulse.

14. The integrate circuit of claim 13, wherein,
the flip-flop comprises a master-slave flip-flop having a clock input that receives a clock signal, a master output and a slave output; and the logic module comprises an exclusive OR gate and an OR gate, and wherein a first input of the exclusive OR gate is coupled to the slave output and a second input of the exclusive OR gate is coupled to the master output, and wherein a first input of the OR gate is coupled to an output of the exclusive OR gate and a second input of the OR gate receives the clock signal.

15. The integrated circuit of claim 14, wherein the pulse width shrinking circuit comprises a delay line and a feedback circuit, wherein the delay line comprises a skewed inverter chain having an even number of inverter stages.

16. A method for monitoring timing path slack in at least one timing path of an integrated circuit, the method comprising:

capturing a transition of a signal transmitted along a signal line of the integrated circuit in a flip-flop;

generating a first pulse in response to the transition, wherein a width of the first pulse is a function of timing path slack associated with the signal line;

receiving in a pulse width shrinking circuit the first pulse and producing in response, a series of pulses of decreasing width, wherein a time taken for the series of pulses to die away is a function of the width of the first pulse;

integrating the series of pulses to produce a second pulse whose duration is a function of a dying time of the first pulse; and measuring a duration of the second pulse.

17. The method of claim 16, further comprising:
comparing the duration of the second pulse with one or more predetermined parameters, and depending upon the comparison, generating one or more adjustment signals; and regulating at least one of a voltage supply and a clock frequency supplied to the integrated circuit using the one or more adjustment signals.

\* \* \* \* \*